Figure 1:
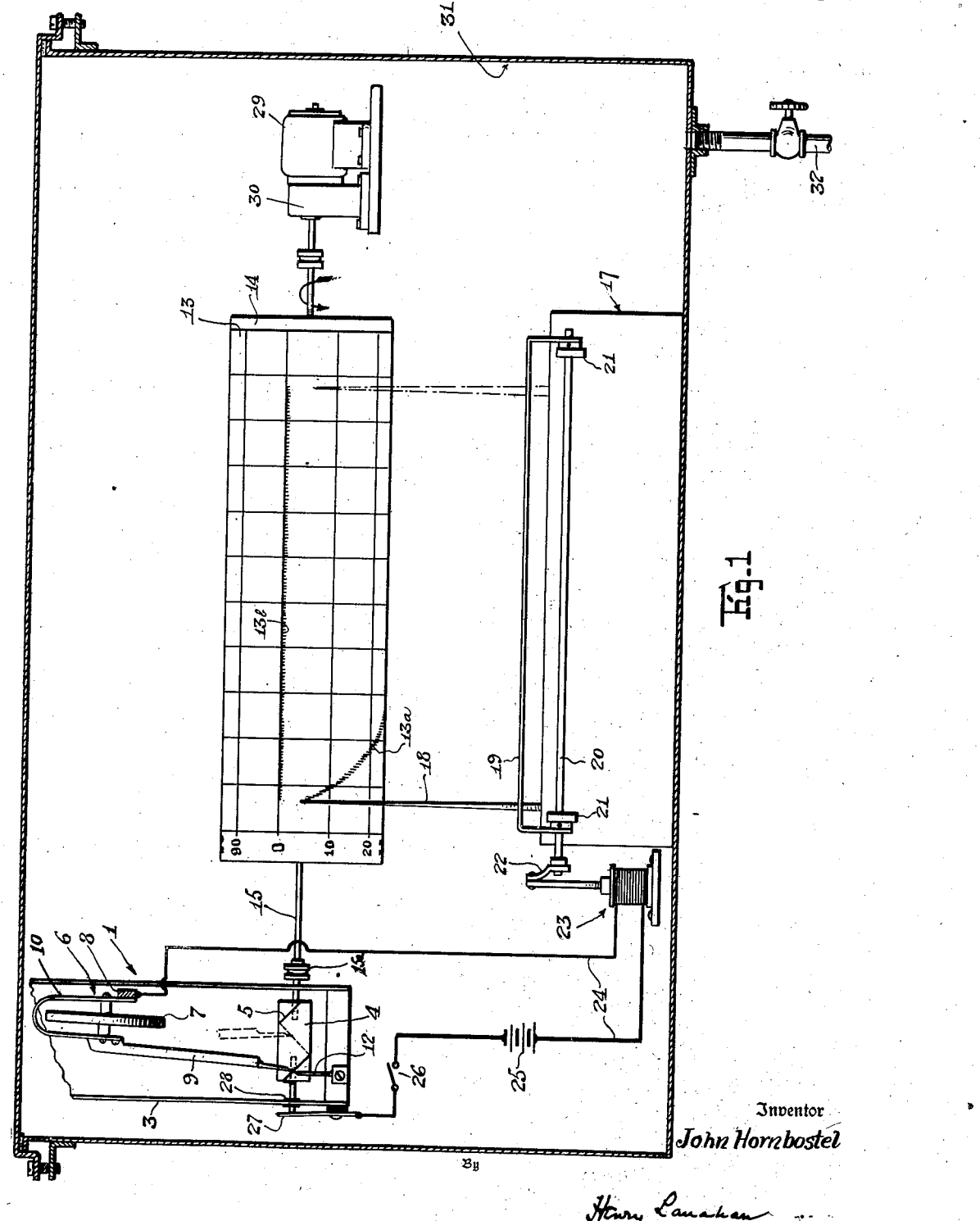

Aug. 12, 1947.   J. HORNBOSTEL   2,425,537
CALIBRATION OF RADIOSONDES
Filed Aug. 17, 1943   2 Sheets-Sheet 1

Inventor
John Hornbostel
By
Henry Lanahan
Attorney

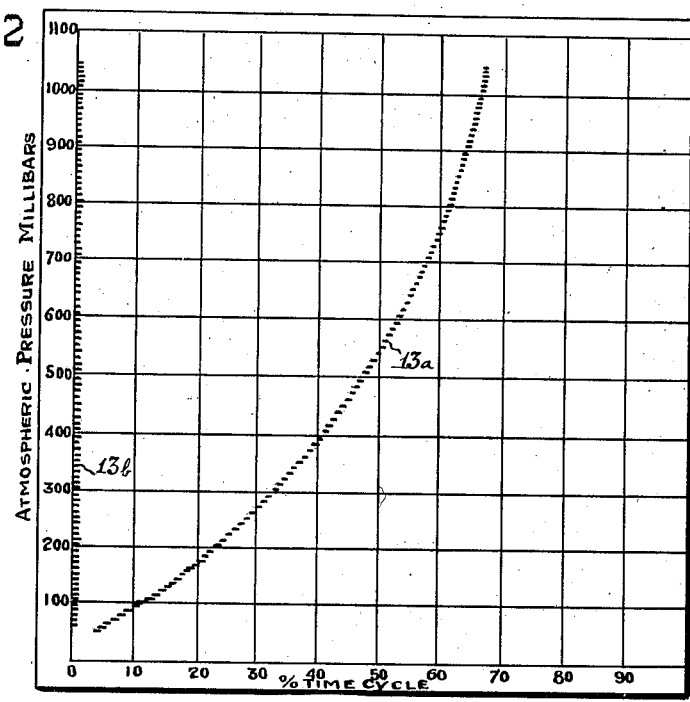

Patented Aug. 12, 1947

2,425,537

UNITED STATES PATENT OFFICE 2,425,537

CALIBRATION OF RADIOSONDES

John Hornbostel, Glen Ridge, N. J., assignor to Thomas A. Edison, Incorporated, West Orange, N. J., a corporation of New Jersey Application August 17, 1943, Serial No. 499,024

2 Claims. (Cl. 73—1)

My invention relates to means for calibrating radiosondes.

The invention is especially adapted for calibrating radiosondes of the chronometric (time-interval) type.

It is an object of my invention to provide an improved means for calibrating radiosondes.

Another object is to provide a means for calibrating radiosondes automatically.

Other objects of my invention are to provide improved means for calibrating radiosondes quickly, economically and with great accuracy.

In its general aspects, my invention contemplates moving a sheet in one direction so that the same will occupy successive positions in predetermined relation to successive deflections of the meteorological instrument responsive to varying applied quantities of a meteorological condition being measured, and making a calibrating mark on the sheet for each position thereof at displacements in another direction corresponding to the applied quantities.

These and other objects and features of my invention will more fully appear from the following description and the appended claims.

In the description of my invention reference is had to the accompanying drawings, of which:

Figure 1 is a view, partly in section, illustrating a means according to my invention for calibrating a chronometric type of radiosonde for atmospheric pressure; and Figure 2 is a pressure calibration chart as obtained from the calibrating apparatus of Figure 1.

In the apparatus shown in Figure 1, there appears fractionally a radiosonde 1 of the chronometric type. (For a detailed description of a preferred construction of this type of radiosonde, reference may be had to my pending application Serial No. 487,425, filed May 15, 1943.) For the present purposes, the radiosonde may be briefly described. It may, for example, have a light frame 3 of a channel form, the sides of which may carry bearings for a contactor cylinder 4. This cylinder is made of an insulating material, such as of Bakelite, but has an exposed spiral conductor, specifically a wire helix 5, embedded in the peripheral surface thereof, the helix having typically slightly more than one revolution. Mounted also on the frame 3 are the meteorological instruments for measuring the respective atmospheric conditions. Normally, each radiosonde will include a barometer, a thermometer and a hygrometer. For simplicity of description, however, I show herein only a barometer 6.

The barometer 6 may comprise a substantially evacuated capsule 7 having one movable side wall thereof secured fixedly to the frame 3, as at 8, and having an indicating arm 9 secured rigidly to the other movable side wall thereof and slidably engaging the surface of the contactor cylinder 4. The side walls of the capsule are urged apart by a strong U-spring 10, there being an equilibrium between the force exerted by the air on the side walls and that due to the spring at each given pressure of the atmosphere. As the atmospheric pressure rises and falls, the capsule is accordingly compressed and expanded, and the indicating arm 9 is moved to the right and left axially along the peripheral surface of the contactor cylinder 4. This indicating arm 9 is made of electrically conductive material and forms with the helix 5 a control circuit for the radiosonde as is hereinafter explained.

The contactor cylinder 4 is driven at constant speed by a suitable motor not shown. Once during each revolution of the cylinder the indicating arm 9 contacts the helix 5 but the particular angular position of the cylinder during each revolution thereof at which this contact occurs varies according to the deflections of the indicating arm 9. Also, so long as the contactor cylinder is driven at constant speed, the percentage interval between the beginning of each time cycle and the instant each contact is made—the term "time cycle" being herein used to mean the fixed time duration of each revolution of the cylinder 4—will also vary according to the deflections of the indicating arm. To enable this percentage interval of each time cycle to be ascertained, the beginning of each time cycle is established by providing a fixed reference arm 12 which is mounted on the frame 3 to slidably engage the surface of the cylinder 4 and make contact with the helix 5 at the same position of the cylinder during each revolution thereof, the instants at which this contact is being made being the beginning and ending of the successive time cycles just mentioned. The time intervals elapsing between each instant the reference arm 12 contacts the helix 5 and the succeeding instant at which the indicating arm contacts the helix is a measure of the atmospheric pressure at that moment. For instance, as the atmospheric pressure rises the successive time intervals increase correspondingly, and vice versa.

In practice, the radiosonde is carried aloft and the closing of the reference and indicating arms with the helix 5 is used for keying a radio transmitter included in the radiosonde equipment. These keyed radio signals are picked up at a ground station and the time intervals between successive signals are there translated into definite measurements of the respective atmospheric conditions. It will be understood, however, that the radio transmission apparatus is only a means of transmitting measurements from the radiosonde per se to the ground, and that this transmitting means need not be considered for the present case.

In order that the successive time intervals aforementioned may be translated into definite measurements of atmospheric condition, the radiosonde equipment must be first calibrated. My invention is concerned with an improved means for making this calibration quickly and accurately, and is especially adapted for fulfilling the need for a simple and inexpensive means for calibrating radiosondes in production.

My calibrating method is adapted to rule out the speed with which the contactor cylinder 4 is driven during calibration as a possible source of error. This is accomplished by mounting a sheet 13 of coordinate paper onto a drum 14 and connecting the drum through shafting 15 and a coupler 15a directly to the contactor cylinder 4, the sheet 13 being so mounted that one axis, which is the abscissa axis in the present case, is disposed circumferentially about the drum and that the other or ordinate axis is disposed axially along the drum with the zero point of the abscissa axis being so disposed that a mark wil be made axially in line therewith when the reference arm 12 contacts the helix 5, as is hereinafter more fully explained. The abscissa axis of the sheet 13 accordingly represents percentage intervals of successive revolutions of the cylinder 4, or of successive time cycles, starting with the angular position of the cylinder when the helix 5 is engaged by the reference arm 12, and the ordinate axis represents the atmospheric pressure (in millibars) corresponding to those respective time intervals.

For producing the calibrating marks on the sheet 13 there is provided a standard barometer herein diagrammatically shown as 17. This barometer has a marking pointer 18 which through suitable linkage (not shown) is adapted to move parallel to the ordinate axis according to changes in ambient pressure, it being understood that the ordinate axis is to be graduated according to the calibration of the barometer. This marking pointer may be of any suitable form adapted for making a suitable mark on the sheet, the term "mark" being herein used to mean any distinguishing sign or character that is written, impressed or cut into the sheet. For instance the pointer may be a pen, or may have an impaling point for making pin holes on the sheet. In any case, though, the pointer is held normally out of contact with the sheet 13 by a suitable upward biasing thereof. However, overlying the pointer is a bail member 19 having a shaft 20 pivoted at 21. This shaft is coupled by linkage 22 to a small electromagnet 23. The coil of this magnet is connected in a circuit 24 which serially includes a battery 25, switch 26, the helix 5 (connection to the helix being made by a blade 27, mounted insulatedly onto the frame 3, which engages one of the two separate spindles provided the cylinder 4, this one spindle being connected permanently to the helix and journalled to the frame in an insulating bushing 28), and the indicating arm 9 of the barometer 6. When the switch 26 is closed, the electromagnet is energized momentarily by contact of the indicating arm 9 with the helix 5 once during each revolution of the cylinder, and the bail 19 is moved downwardly to depress the pointer 18 momentarily into contact with the sheet 13.

In carrying out the calibration procedure, the radiosonde and standard barometer 17 are subjected alike to varying pressure through the range for which the radiosonde is to be calibrated, and the cylinder 4 and drum 14 are turned at a slow suitable speed as by hand or preferably by motor 29 through step-down gearing 30. To obtain the pressure variation, the radiosonde and standard barometer are enclosed in a chamber 31. For simplicity of description, all the other apparatus is shown as being likewise included in this chamber, but it will be understood that various parts of the apparatus might be located outside the chamber and may, in instances, be preferably so placed outside the chamber. The pressure range for which the radiosonde is to be calibrated extends from the atmospheric pressure at ground level, which will be of the order of 1,020 millibars, to some very low pressure approximating that at high altitudes, say a pressure of 100 or less millibars. Normally, the calibration will be made by starting with a pressure within the chamber 31 equal to the outside ambient pressure at ground level and then decreasing the pressure by gradually withdrawing air from the chamber 31 by way of an outlet tube 32. For the maximum pressure, the marking pointer of the standard barometer will occupy a rightward position as is indicated by dash-dot lines in Figure 1 and the indicating arm 9 of the radiosonde barometer will likewise occupy a rightward position typically at an interval of approximately 60% of the axial length of one revolution of the helix 5 from the reference arm 12. As the pressure in the chamber 31 is gradually decreased the marking pointer will move leftwardly, as will also the indicating arm 9, and they will come at minimum pressure into the positions which they occupy in Figure 1. The pointer is depressed once during each revolution of the contactor cylinder, at the instant the arm engages the helix 5, and makes a succession of marks 13a on the sheet 13 as is indicated in Figure 1. The calibration chart which is so produced will appear, when it is removed from the drum 14, substantially as is shown in Figure 2.

I have herein shown the indicating arm 9 as being electrically connected to the frame 3 as is also the reference arm 12. Upon connecting the circuit 24 of the electromagnet between the frame and the helix 5 as is shown, it will be understood that this circuit is closed twice during each revolution, once by contact of the indicating arm 9 with the helix as is above explained and once by contact of the reference arm 12 with the helix. The closing of this circuit by the reference arm 12 occurs however at the same position of the contactor cylinder in each revolution thereof— that is, when the zero point of the abscissa axis is in line axially with the contact point of the reference arm 12 that engages the helix 5. The closing of the circuit 24 by the reference arm accordingly produces a succession of marks 13b along the ordinate axis. These marks aid as a check on the proper positioning of the ordinate axis of the sheet 13 on the drum. It will of course be understood that, if desired, these marks may be avoided by suitably disconnecting the reference arm 12 from the frame 3, or by withholding it from contact with the cylinder 4, during the calibrating procedure.

Since the drum 14 which carries the sheet 13 is turned coordinately with the cylinder 4 of the radiosonde, the accuracy of my calibrating apparatus is not affected by variations in the speed of the drum and cylinder, nor does it depend upon turning the drum and cylinder at any particular speed other than that the speed should not be so high that the inertia of the pointer 18 and its depressing mechanism should come into play. Thus, my calibrating procedure, being not made on a time basis, is substantially free from error. Additionally, it will be observed that aside from connecting the radiosonde to the drum 14 and suitably mounting the sheet 13 onto the drum—which are in the nature of setting the apparatus up for operation—the calibration is carried out wholly automatically as the pressure is gradually reduced in the chamber 31.

To calibrate the radiosonde for temperature or humidity, the procedure is the same as hereinabove described except of course that an appropriate standard meteorological instrument (a standard thermometer or hygrometer) is used in place of the standard barometer 17 and the air space within the chamber 31 is varied in respect of temperature or humidity as the case may be.

While I have herein shown and described my invention in terms of a preferred embodiment thereof, it will be understood that this embodiment is illustrative and not limitative of my invention as the same is subject to changes and modifications without departure from the scope of my invention, which I endeavor to express according to the following claims.

I claim:

1. Apparatus for calibrating a radiosonde of the time-interval type for a given condition of the atmosphere, said radiosonde having a meteorological instrument responsive to variations in said condition and a rotating contactor cylinder having a helical contact element engaged by an indicating arm of said instrument once during each revolution of said cylinder, comprising a rotatable drum for carrying a calibrating sheet on the periphery thereof, means for turning the contactor cylinder of the radiosonde and said drum coordinately with one another, means for subjecting said instrument to successive values of the condition to be measured, and means controlled by said contactor cylinder for making marks successively on said sheet at the instants said helical contact element is engaged by said indicating arm and at positions along the drum corresponding to the deflections of said meteorological instrument.

2. In apparatus for plotting a calibrating curve on a sheet for a radiosonde of the time-interval type, said radiosonde including a rotating contactor having an exposed spiral conductor and a meteorological instrument having an indicating arm moved in response to variations in a condition of the atmosphere and adapted to engage said conductor at varying instants of each revolution of said contactor according to the deflections of said pointer: the combination of a drum for carrying said sheet, means for connecting said drum to said contactor, means for rotating said drum and contactor, a standard meteorological instrument having a marking pointer moved axially along said drum in response to variations in said condition, means for applying to said instruments a succession of values of said condition, and means controlling said marking pointer to cause the same to momentarily engage said sheet at each instant said conductor is engaged by said indicating arm.

JOHN HORNBOSTEL.

REFERENCES CITED

The following references are of record in the file of this patent:

UNITED STATES PATENTS

| Number | Name | Date |
|---|---|---|
| 2,001,335 | Urfer | May 14, 1935 |
| 2,300,803 | Pattee | Nov. 3, 1942 |
| 2,275,977 | Means et al. | Mar. 10, 1942 |
| 2,310,974 | Lumm | Feb. 16, 1943 |
| 2,210,903 | Dunmore | Aug. 13, 1940 |